(12) United States Patent
Nguyen et al.

(10) Patent No.: US 11,483,171 B2
(45) Date of Patent: Oct. 25, 2022

(54) SYSTEM AND METHOD TO CONTROL LATENCY OF SERIALLY-REPLICATED MULTI-DESTINATION FLOWS

(71) Applicant: Cisco Technology, Inc., San Jose, CA (US)

(72) Inventors: Dennis Khoa Dang Nguyen, San Jose, CA (US); Chih-Tsung Huang, Burlingame, CA (US)

(73) Assignee: Cisco Technology, Inc., San Jose, CA (US)

( * ) Notice: Subject to any disclaimer, the term of this patent is extended or adjusted under 35 U.S.C. 154(b) by 64 days.

(21) Appl. No.: 16/901,260

(22) Filed: Jun. 15, 2020

(65) Prior Publication Data

US 2020/0313921 A1    Oct. 1, 2020

Related U.S. Application Data

(63) Continuation of application No. 16/286,031, filed on Feb. 26, 2019, now Pat. No. 10,686,616, which is a
(Continued)

(51) Int. Cl.
*H04L 12/18* (2006.01)
*H04L 47/34* (2022.01)
(Continued)

(52) U.S. Cl.
CPC ........ *H04L 12/1886* (2013.01); *H04L 47/125* (2013.01); *H04L 47/283* (2013.01);
(Continued)

(58) Field of Classification Search
CPC ... H04L 12/1886; H04L 47/283; H04L 47/34; H04L 49/901
See application file for complete search history.

(56) References Cited

U.S. PATENT DOCUMENTS

| | | |
|---|---|---|
| 6,553,028 B1 | 4/2003 | Tang et al. |
| 6,751,219 B1 | 6/2004 | Lipp et al. |
| (Continued) | | |

FOREIGN PATENT DOCUMENTS

EP    2997702    3/2016

OTHER PUBLICATIONS

Search Report, dated Nov. 21, 2017, received in connection with corresponding EP Patent Application No. 17183138.1.

*Primary Examiner* — Rina C Pancholi
(74) *Attorney, Agent, or Firm* — Meunier Carlin & Curfman LLC

(57) ABSTRACT

Exemplified systems and methods facilitate multicasting latency optimization operations for router, switches, and other network devices, for routed Layer-3 multicast packets to provide even distribution latency and/or selective prioritized distribution of latency among multicast destinations. A list of network destinations for serially-replicated packets is traversed in different sequences from one packet to the next, to provide delay fairness among the listed destinations. The list of network destinations are mapped to physical network ports, virtual ports, or logical ports of the router, switches, or other network devices and, thus, the different sequences are also traversed from these physical network ports, virtual ports, or logical ports. The exemplified systems and methods facilitates the management of traffic that is particularly beneficial in in a data center.

20 Claims, 9 Drawing Sheets

Related U.S. Application Data continuation of application No. 15/349,629, filed on Nov. 11, 2016, now Pat. No. 10,218,525.

(51) Int. Cl.
  *H04L 49/901* (2022.01)
  *H04L 47/283* (2022.01)
  *H04L 47/125* (2022.01)
  *H04L 49/201* (2022.01)

(52) U.S. Cl.
  CPC ............ *H04L 47/34* (2013.01); *H04L 49/201* (2013.01); *H04L 49/901* (2013.01)

(56) References Cited

U.S. PATENT DOCUMENTS

| | | |
|---|---|---|
| 7,710,962 B2 | 5/2010 | Kodama et al. |
| 8,184,540 B1 | 5/2012 | Perla et al. |
| 8,891,513 B1 | 11/2014 | Huang et al. |
| 8,982,884 B2 | 3/2015 | Suresh et al. |
| 2012/0269110 A1* | 10/2012 | Walker ................ H04L 12/1863 370/312 |
| 2014/0071988 A1* | 3/2014 | Li .......................... H04L 12/18 370/390 |
| 2016/0087808 A1* | 3/2016 | Schmidt .............. H04L 12/1863 370/390 |

* cited by examiner

FIG. 4A

| ADDR | BD | NEXT[0] | NEXT[..] | NEXT[n-1] |
|---|---|---|---|---|
| 0 | 23 | 77 | NULL | NULL |
| 7 | 89 | 0 | 18 | 77 |
| 18 | 1000 | NULL | 77 | 0 |
| 77 | 444 | 18 | 0 | 18 |

FIG. 4B

| ADDR | BD | NEXT[0] | NEXT[..] | NEXT[n-1] |
|---|---|---|---|---|
| 0 | 23 | 77 | NULL | NULL |
| 7 | 89 | 0 | 18 | 77 |
| 18 | 1000 | NULL | 77 | 0 |
| 77 | 444 | 18 | 0 | 18 |

FIG. 4C

| ADDR | BD | NEXT[0] | NEXT[..] | NEXT[n-1] |
|---|---|---|---|---|
| 0 | 23 | 77 | NULL | NULL |
| 7 | 89 | 0 | 18 | 77 |
| 18 | 1000 | NULL | 77 | 0 |
| 77 | 444 | 18 | 0 | 18 |

SYSTEM AND METHOD TO CONTROL LATENCY OF SERIALLY-REPLICATED MULTI-DESTINATION FLOWS

This is a continuation application of U.S. application Ser. No. 16/286,031, filed Feb. 26, 2019, now U.S. Pat. No. 10,686,616, which is a continuation application of U.S. application Ser. No. 15/349,629, filed Nov. 11, 2016, now U.S. Pat. No. 10,218,525, which is incorporated by reference herein in its entirety.

TECHNICAL FIELD

The present disclosure relates to multicasting traffic in a communication network.

BACKGROUND

Certain industries have demanding Information Technology (IT) requirements which make the management of enterprise systems difficult. For example, information flow in certain financial trading environments may be latency sensitive while, at the same time necessitating, requirements for high availability and high throughput performance. The ability to effectively differentiated services based on throughput and latency thus offers the opportunity to provide providing customer-service tiered levels.

Network operations such as Equal-Cost Multi-Path Routing (ECMP) and flowlet hashing facilitate distribution of flows over multiple links to maximize network utilization.

BRIEF DESCRIPTION OF THE DRAWINGS

To facilitate an understanding of and for the purpose of illustrating the present disclosure, exemplary features and implementations are disclosed in the accompanying drawings, it being understood, however, that the present disclosure is not limited to the precise arrangements and instrumentalities shown, and wherein similar reference characters denote similar elements throughout the several views, and wherein:

FIG. 4, comprising FIGS. 4A, 4B, and 4C, illustrates example sequences of replication per different multi-linked references in the multi-linked Multicast Expansion Table, in accordance with an illustrative embodiment;

FIGS. 8A, 8B, and 8C, illustrates example packet structures having Multicast Expansion Table Traversal Sequence (MTS) tags, in accordance with an illustrative embodiment.

DESCRIPTION OF EXAMPLE EMBODIMENTS

Overview

Figure 1:
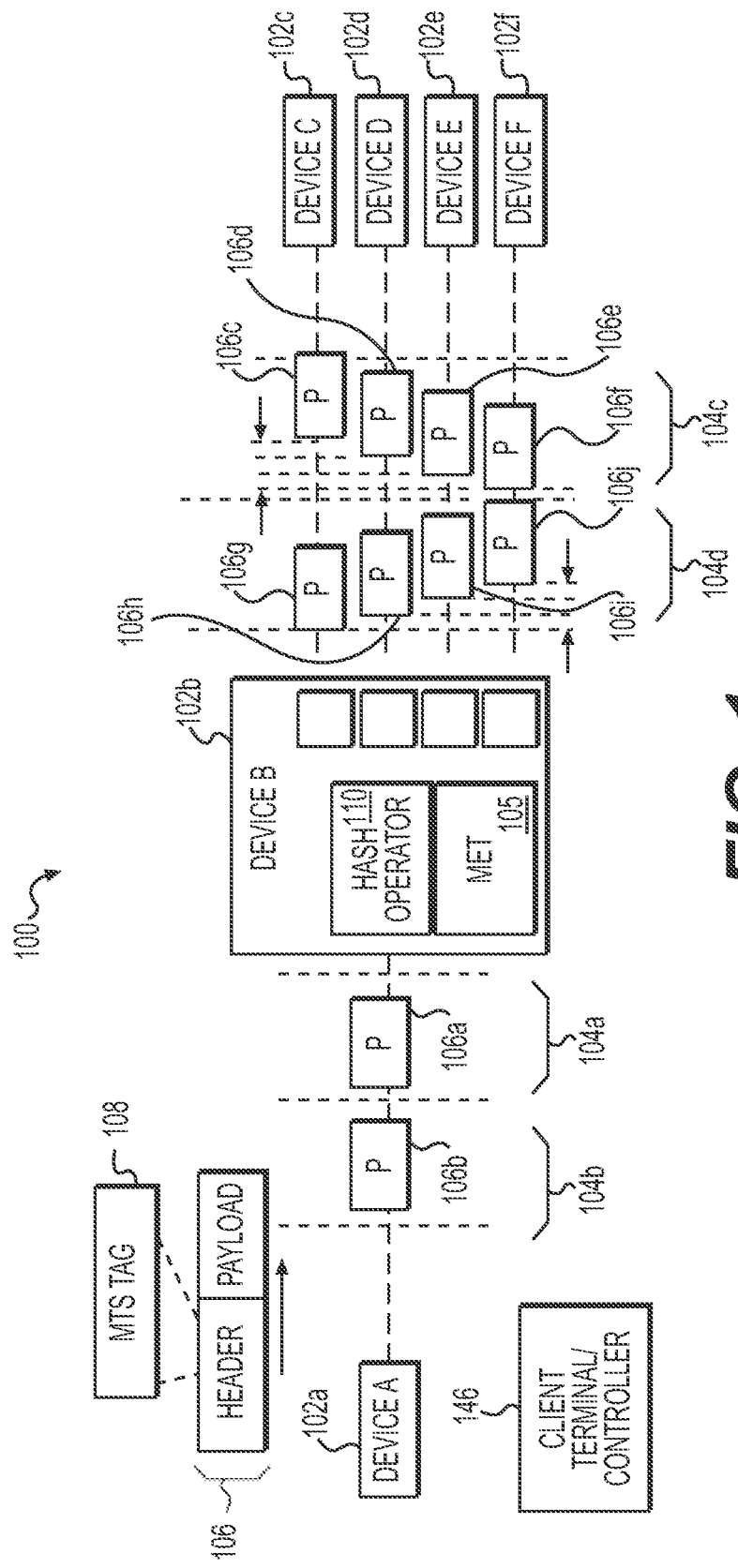
FIG. 1 is a block diagram illustrating example network devices for serially replicating multicast traffic in a communication network in accordance with an illustrative embodiment.

Exemplified systems and methods are provided that facilitate multicasting latency-control operations for routers, switches, and other network devices, for routed multicast packets (e.g., Layer-3 packets). In particular, exemplified systems and methods are able to provide even distribution of latency and/or selective/prioritized distribution of latency among multicast destinations. In some embodiments, a list of network destinations for serially-replicated packets in a multi-linked Multicast Expansion Table is traversed in different sequences from one flow to the next, to provide delay-fairness or delay-priority among the listed destinations for a given set of multicast traffic. The exemplified systems and methods can facilitate the management of traffic that is particularly beneficial in a data center.

In some embodiments, the exemplified systems and methods provide a multi-linked linked list in a Multicast Expansion Table (i.e., a multi-linked MET) to serially replicate packets to network destinations. The multi-linked MET facilitates the varied replication of traffic to certain destinations, at an earlier time, and to those same destinations at a later time, to ensure that all destinations can be serviced at a same or similar averaged delay. Moreover, the multi-linked MET can be used to selectively prioritize latency at a certain destination.

In some embodiments, the multi-linked MET is dynamically updatable during live multicasting operations (i.e., in real-time) without the need to disable multicasting operations.

In an aspect, an apparatus (e.g., a router or a switch) is disclosed, the apparatus includes a plurality of network ports configured to serially replicate multicast traffic, the multicast traffic including a first multicast traffic and a second multicast traffic (e.g., the first and second multicast traffic having the same n-tuple (e.g., 5-tuple)), so as to forward, via a network, replicated multicast traffic to a plurality of computing devices, wherein each multicast traffic comprises one or more packets to be directed to multiple destination flows. The apparatus further includes a Multicast Expansion Table, implemented in memory of the apparatus, comprising a plurality of entries each associated with a network port (e.g., Bridge Domain, a set of network ports, a group of network ports, a group of hosts, a multicast group, etc.) of the plurality of network ports, wherein traversal of the plurality of entries of the Multicast Expansion Table, for a given multicast traffic, defines a sequence of the serial replication of the given multicast traffic over one or more sets of network ports. The packets associated with the first multicast traffic are serially replicated over a first set of network ports in accordance with a first sequence corresponding to a first traversal of the entries in the Multicast Expansion Table. The packets associated with the second multicast traffic are serially replicated in accordance with a second sequence corresponding to a second traversal of the entries of the Multicast Expansion Table. The first sequence is different from the second sequence.

In some embodiments, where the packets associated with the multicast traffic are serially replicated by the apparatus according to a plurality of sequences, each consecutive sequence differs from the previous sequence so as to vary a sequence of packets replication across the plurality of network ports such that each network port has a replication latency matching that of other ports (e.g., wherein each network port of the plurality of network ports has a same or similar average latency).

In some embodiments, where each entry of the plurality of entries of the Multicast Expansion Table comprises one or more pointers, each pointer addresses a next entry in the plurality of entries to form a traversable sequence for the first multicast traffic and the second multicast traffic.

In some embodiments, where each entry of the plurality of entries of the Multicast Expansion Table comprises two or more pointers, each pointer of a given entry addresses a next entry in the plurality of entries to form a single traversable sequence for the first multicast traffic and the second multicast traffic, the two or more pointers, collectively, forming multiple traversable sequences, including a first traversable sequence associated with a first pointer in the given entry and a second traversable sequence associated with a second pointer in the given entry.

In some embodiments, where the Multicast Expansion Table comprises an identifier (e.g., an address for the entry) for each entry, the apparatus includes a second Table (e.g., a second Multicast Expansion Table) comprising a plurality of pointers that each addresses the identifier for the each entry to form a given traversable sequence for the first multicast traffic and the second multicast traffic.

In some embodiments, where each entry of the plurality of entries of the Multicast Expansion Table comprises one or more pointers, and where each pointer addresses a next entry in the plurality of entries to form a given traversable sequence for the first multicast traffic and the second multicast traffic, the apparatus includes a processor and the memory, in which the memory comprises instructions stored thereon that when executed by the processor cause the processor to generate the pointers for the Multicast Expansion Table. The pointers are generated according to an order selected from the group consisting of a random order, a numerical order, and a reverse numerical order.

In some embodiments, where each entry of the plurality of entries of the Multicast Expansion Table comprises one or more pointers, and where each pointer addressing a next entry in the plurality of entries to form a given traversable sequence for the first multicast traffic, the apparatus includes a processor and the memory, in which the memory comprises instructions stored thereon that when executed by the processor cause the processor to generate the pointers for the Multicast Expansion Table, wherein the pointers are generated according to a priority value associated with the first multicast traffic (e.g., those specified in a customer Service-Level Agreement).

In some embodiments, where each entry of the plurality of entries of the Multicast Expansion Table comprises one or more pointers, and where each pointer addresses a next entry in the plurality of entries to form a given traversable sequence for the first multicast traffic, the apparatus includes a processor and the memory, in which the memory comprises instructions stored thereon that when executed by the processor cause the processor to: update, upon each replication of the first multicast traffic and the second multicast traffic, an average latency value for each network port of the plurality of network ports; and generate the pointers for the Multicast Expansion Table, wherein the pointers are generated according to a largest serially replicated flow delay value (e.g., for a L2 or L3 flow or flowlet) of the average latency value to a lowest value of the average latency value.

In some embodiments, where the Multicast Expansion Table comprises an identifier for each entry, and where the apparatus includes a second Table (e.g., a second Multicast Expansion Table) comprising a plurality of pointers that each addresses the identifier for each entry to form a given traversable sequence for the first multicast traffic and the second multicast traffic, the apparatus includes a processor and the memory, in which the memory comprises instructions stored thereon that when executed by the processor cause the processor to generate the plurality of pointers for the Multicast Expansion Table, wherein the plurality of pointers are generated according to an order selected from the group consisting of a random order, a numerical order, and a reverse numerical order.

In some embodiments, where the Multicast Expansion Table comprises an identifier for each entry, and where the apparatus includes a second Table (e.g., a second Multicast Expansion Table) comprising a plurality of pointers that each addresses the identifier for each entry to form a given traversable sequence for the first multicast traffic and the second multicast traffic, the apparatus includes a processor and the memory, in which the memory comprises instructions stored thereon that when executed by the processor cause the processor to generate the plurality of pointers for the Multicast Expansion Table, wherein the plurality of pointers are generated according to a priority value associated with a given multicast traffic (e.g., those specified in a customer Service-Level Agreement).

In some embodiments, where the Multicast Expansion Table comprises an identifier for each entry, and where the apparatus includes a second Table (e.g., a second Multicast Expansion Table) comprising a plurality of pointers that each addresses the identifier for each entry to form a given traversable sequence for a given multicast traffic, the apparatus includes a processor and the memory, in which the memory comprises instructions stored thereon that when executed by the processor cause the processor to: update, upon each replication of a given multicast traffic, an average latency value for each network port of the plurality of network ports; and generate the pointers for the Multicast Expansion Table, wherein the plurality of pointers are generated according to a largest serially replicated flow delay value (e.g., for a L2 or L3 flow or flowlet) of the average latency value to a lowest value of the average latency value.

In some embodiments, all packets in a flow or a burst of flow (e.g., flowlet) associated with the first multicast traffic are serially replicated across the plurality of network ports according to the first sequence prior to packets in a second flow or second burst of flow associated with the second multicast traffic being serially replicated across the plurality of network ports according to the second sequence.

In some embodiments, where the multicast traffic are serially replicated according to a plurality of sequences, and where each consecutive sequence differs from the previous sequence so as to vary sequence of packets replication across the plurality of network ports, the apparatus includes a processor and the memory, in which the memory comprises instructions stored thereon that when executed by the processor cause the processor to: measure packet latency parameters for the plurality of network ports (e.g., as measured by IEEE 1588); and generate a current sequence or a next sequence of packet replication over the plurality of network ports based on the measured packet latency parameters.

In some embodiments, where the multicast traffic are serially replicated according to a plurality of sequences, and where each consecutive sequence differs from the previous sequence so as to vary a sequence of packets replication across the plurality of network ports, the apparatus includes a processor and the memory, in which the memory comprises instructions stored thereon that when executed by the processor cause the processor to: maintain an identifier associated with a set of network ports (e.g., Bridge Domain, a set of network ports, a group of network ports, a group of hosts, a multicast group, etc.) that is latency-sensitive; and generate a current sequence or a next sequence of packet replication over the plurality of network ports based on the maintained identifier such that the set of network ports that is latency-sensitive is located proximal to a beginning portion (e.g., before ½ point in the sequence) of the current or next sequence.

In some embodiments, the apparatus includes a processor and the memory, in which the memory comprises instructions stored thereon that when executed by the processor cause the processor to cause a received multicast traffic to be serially replicated across the plurality of network ports, wherein packets associated with the replicated multicast traffic are each encapsulated with a header field (e.g., a VXLAN/NVGRE field or packet header field) that comprises field data (e.g., a sequence id.) associated with the MET Traversal Sequence (MTS) (e.g., wherein the MTS is determined by a hash on a flow's n-tuples).

In some embodiments, where each entry of the plurality of entries of the Multicast Expansion Table comprises two or more pointers, and where each pointer of a given entry addresses a next entry in the plurality of entries to form a single traversable sequence for a given multicast traffic, the two or more pointers, collectively, forming multiple traversable sequence, including a first traversable sequence associated with a first pointer in the given entry and a second traversable sequence associated with a second pointer in the given entry, the apparatus includes a processor and the memory, in which the memory comprises instructions stored thereon that when executed by the processor cause the processor to transmit a message to a second apparatus (e.g., a second router/switch) or a controller (e.g., a controller-driven or distributed system) in the network, the message comprising a parameter (e.g., a MET Traversal Sequence tag) associated with a number of sequences available per apparatus for the two or more pointers, wherein the transmitted parameter causes the second apparatus to vary a sequence to serially replicate a given multicast traffic thereat (e.g., to optimize end-to-end L3 latency distribution or to account for network performance or member list changes).

In some embodiments, the apparatus comprises a switch or a router.

In another aspect, a method is disclosed. The method includes receiving, at a network port of a network device, a first packet associated with a first multicast traffic, and in response to receipt of the first packet: i) serially replicating, across a first set of network ports of a plurality of network ports associated with the network device, according to a first sequence of the first set of network ports, the first multicast traffic; and ii) forwarding, via a network, the replicated multicast traffic to a plurality of computing devices associated with the first multicast traffic. The method further includes receiving, at the network device (e.g., at a same or different network port), a second packet associated with a second multicast traffic, and in response to receipt of the second packet: i) serially replicating, across a second set of network ports (e.g., a same or different set of network ports as the first set of network ports) of a plurality of network ports associated with the network device, according to a second sequence of the second set of network ports, the second multicast traffic; and ii) forwarding, via the network, the replicated multicast traffic to a plurality of computing devices associated with the second multicast traffic.

In some embodiments, the serial replication of the first multicast traffic and the second multicast traffic is i) based on traversal of a plurality of entries in a Multicast Expansion Table (MET) associated with the network device and ii) based on a sequence list associated therewith (e.g., wherein the sequence list is formed as a link list of pointers in each entry of the Multicast Expansion Table or as a link list of pointers to identifiers associated with each entry), each entry being associated with a set of network ports of the first set of network ports, wherein the first sequence is different from the second sequence.

In another aspect, a non-transitory computer readable medium is disclosed. The computer readable medium comprises instructions stored thereon, wherein execution of the instructions, cause a processor a network device to cause the network device to: in response to receiving, at a network port of the network device, a first packet associated with a first multicast traffic, i) serially replicate, across a first set of network ports of a plurality of network ports associated with the network device, according to a first sequence of the first set of network ports, the first multicast traffic and ii) forward, via a network, the replicated multicast traffic to a plurality of computing devices associated with the first multicast traffic; and in response to receiving (e.g., at a same or different network port) a second packet associated with a second multicast traffic, i) serially replicate, across a second set of network ports (e.g., a same or different set of network ports as the first set of network ports) of a plurality of network ports associated with the network device, according to a second sequence of the second set of network ports, the second multicast traffic and ii) forward, via the network, the replicated multicast traffic to a plurality of computing devices associated with the second multicast traffic (e.g., wherein the computing devices associated with the first multicast traffic is the same or different to the computing device associated with the second multicast traffic).

In some embodiments, the serial replication of the first multicast traffic and the second multicast traffic (e.g., the first and second multicast traffic having the same n-tuple (e.g., 5-tuple)) is i) based on traversal of a plurality of entries in a Multicast Expansion Table (MET) associated with the network device and ii) based on a sequence list associated therewith (e.g., wherein the sequence list is formed as a link list of pointers in each entry of the Multicast Expansion Table or as a link list of pointers to identifiers associated with each entry), each entry being associated with a network port of the first set of network ports. The first sequence being different from the second sequence.

Certain terminology is used herein for convenience only and is not to be taken as a limitation on the present invention. In the drawings, the same reference numbers are employed for designating the same elements throughout the several figures. A number of examples are provided, nevertheless, it will be understood that various modifications can be made without departing from the spirit and scope of the disclosure herein. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed.

The present invention now will be described more fully hereinafter with reference to specific embodiments of the invention. Indeed, the invention can be embodied in many different forms and should not be construed as limited to the embodiments set forth herein; rather, these embodiments are provided so that this disclosure will satisfy applicable legal requirements.

Example Network

FIG. 1 is a block diagram illustrating example network devices 102 for serially replicating multicast traffic in a communication network 100 in accordance with an embodiment of the present disclosure. As shown in FIG. 1, the network devices 102 (shown as "Device A" 102a, "Device B" 102b, "Device C" 102c, "Device D" 102d, "Device E" 102e, and "Device F", 102f) transmit multicast traffic flows 104 (shown as traffic flow 104a, 104b, 104c, 104d) comprising packets 106 (shown as packet 106a of traffic flow 104a, packet 106b of traffic flow 104b, packets 106c-f of traffic flow 104c, and packets 106g-j of traffic flow 104d). Example of multicast-packets 106 include communication traffic or data such as numeric data, voice data, video data, script data, source or object code data, and etc.

As shown in FIG. 1, network device 102b is configured to serially replicate multicast traffic flows or flowlets 104a and 104b, in accordance with a multi-linked Multicast Expansion Table (MET) 105, so as to forward, via the network 100, respective replicated multicast traffic flows 104c and 104d to network devices 102c-f. As shown, replicated multicast traffic flow 104c comprising replicated multicast packets 106c-f are transmitted in accordance with a first replication sequence (i.e., the ordering in which the packets are generated at a logical or physical network port of the network device 102) in which replicated packet 106c is transmitted to network device 102c; replicated multicast packet 106d is transmitted to network device 102d; replicated multicast packet 106e is transmitted to network device 102e; and replicated multicast packet 106f is sent to network device 102f. Because replicated multicast packets (e.g., 106c-106e) are transmitted in accordance with a sequence, there are latencies between each of the packet replications, which are cumulative between the first and last replicated multicast packet (e.g., 106c and 106e).

As shown in FIG. 1, the network device 102b replicates, via the multi-linked Multicast Expansion Table (MET) 105, a second replicated multicast traffic flow 104d that includes multicast packets 106g-j and that corresponds to ingress flow 104b having multicast packet 106b. As shown, replicated multicast traffic flow 104d, comprising replicated multicast packets 106g-j, is transmitted in accordance with a second replication sequence in which replicated multicast packet 106g is transmitted to network device 102c; replicated multicast packet 106h is transmitted to network device 102d; replicated multicast packet 106i is transmitted to network device 102e; and replicated multicast packet 106j is sent to network device 102f. Accordingly, two multicast traffic flows 104a and 104b are replicated in accordance with a different respective sequence to produce replicate multicast traffic flows 104c, and 104d. Because each respective sets of replicated packets (e.g., 106c-106f and 106g-106j) is generated in accordance with different sequences, the averaged latency for each of the replicated multicast packets with respect to one another (e.g., 102b) is varied—this allows the average latency to be more fairness distributed and/or allows for certain sets of replicated multicast packets to be prioritized.

It is contemplated that the exemplified methods and systems can be used with any numbers of multicast flows and sequences.

The network devices 102 may include switches, routers, and other network elements that can interconnect one or more nodes within a network. The network devices 102 include hardware and/or software that enables the network devices 102 to inspect a received packet, determine whether and how to replicate the received packet, and to forward a replicate packet. The term "switch" and "router" may be interchangeably used in this Specification to refer to any suitable device, such as network devices 102, that can receive, process, forward packets in a network, and perform one or more of the functions described herein. The network devices 102 may forward packets (e.g., 104, 106) according to certain specific protocols (e.g., TCP/IP, UDP, etc.).

Referring still to FIG. 1, the network device 102 utilizes a MTS (Multicast Expansion Table Traversal Sequence) tag 108 to ascertain a traversal sequence of the Multicast Expansion Table 105 to use when serially replicating a given multicast traffic flow. In some embodiments, the MTS tag 108 is explicitly communicated between network devices 102, for example, via control plane signaling. That is, in some embodiments, a network device 102 (e.g., network device 102a) encapsulates the packets 106 of a multicast traffic flow 104 to include an MTS tag 108 such that subsequent downstream network devices 102 (e.g., network device 102b and 102c-102f) are able to identify the appropriate traversal sequence in the Multicast Expansion Table 105 based on the MTS tag 108. In some embodiments, the MTS tag 108 is inserted in a field of a header of the packet 106, such as in a reserved VxLAN/NVGRE field or other packet header (e.g., other existing EtherTypes or customized MTS-based EtherTypes). Downstream network device 102 (e.g., 102b) can determine a traversal sequence for the replication for the multicast traffic flow 104 by inspecting packets 106 for MTS tag 108.

In some embodiments, a hash module 110 (shown as "hash operator" 110) executing or implemented on a network device (e.g., 102b) determines a MTS tag 108 associated with a traversal sequence for replication of a given multicast traffic flow 104. The hashing module 110, in some embodiments, includes computer executable instructions stored in memory (e.g., memory 116), which when executed, cause a processor to hash a given multicast flow (e.g., flow n-tuples, e.g., header source and destination addresses, TCP fields, etc.) to generate the MTS tag 108. In some embodiments, the hashing module 110 is implemented in a logical circuit such as an ASIC (Application-Specific Integrated Circuit), CPLD (complex programmable logic device), and etc. The hashing module 110 may be used in addition to, or as an alternative of, encapsulating packets with MTS tags 108. Hashing, in some embodiments, ensures sufficient randomness during latency normalization operations.

Figure 2:
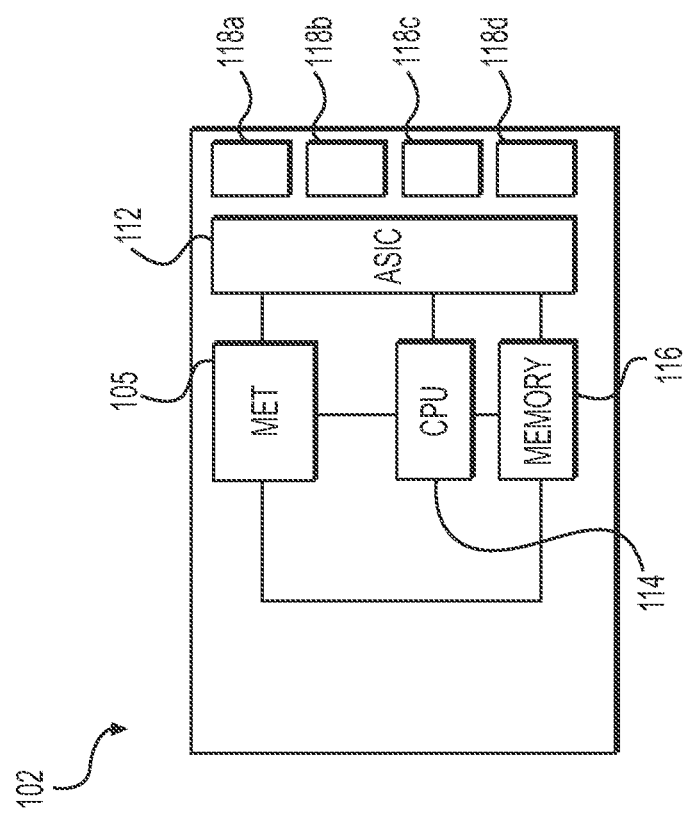
FIG. 2 is a block diagram illustrating an example network device in accordance with an illustrative embodiment.

FIG. 2 is a block diagram illustrating an example network device 102 in accordance with an illustrative embodiment. In FIG. 2, the example network device 102 includes a multi-linked Multicast Expansion Table (MET) 105 that is coupled to an ASIC 112, a processor 114, a memory 116, and a plurality of network ports 118 (shown as ports 118a, 118b, 118c, 118d). The ASIC 112, in some embodiments, is configured to perform one or more functions including, for example normal, routing functions such as bridging, routing, redirecting, traffic policing and shaping, access control, queuing/buffering, network translation, and other functions of a Layer 2 and/or Layer 3 capable switch. The ASIC 112 may include components such as: Layer 2/Layer 3 packet processing component that performs Layer-2 and Layer-3 encapsulation, decapsulation, and management of the division and reassembly of packets within network device 102; queuing and memory interface component that manages buffering of data cells in memory and the queuing of notifications; a routing component that provides route lookup functionality; switch interface component that extracts the route lookup key and manage the flow of data cells across a switch fabric; and media-specific component that performs control functions tailored for various media tasks. The ASIC 112, in some embodiments, interfaces with the Multicast Expansion Table 105 to serially replicate multicast traffic to the plurality of network ports 118.

The Multicast Expansion Table (MET) 105, in some embodiments, is implemented in a memory located in a portion of the ASIC 112. In some embodiments, the MET 105 is implemented in memory that interfaces the ASIC 112.

A processor can execute any type of instructions associated with the data to achieve the operations detailed herein.

Example Multicast Expansion Tables

Figure 3:
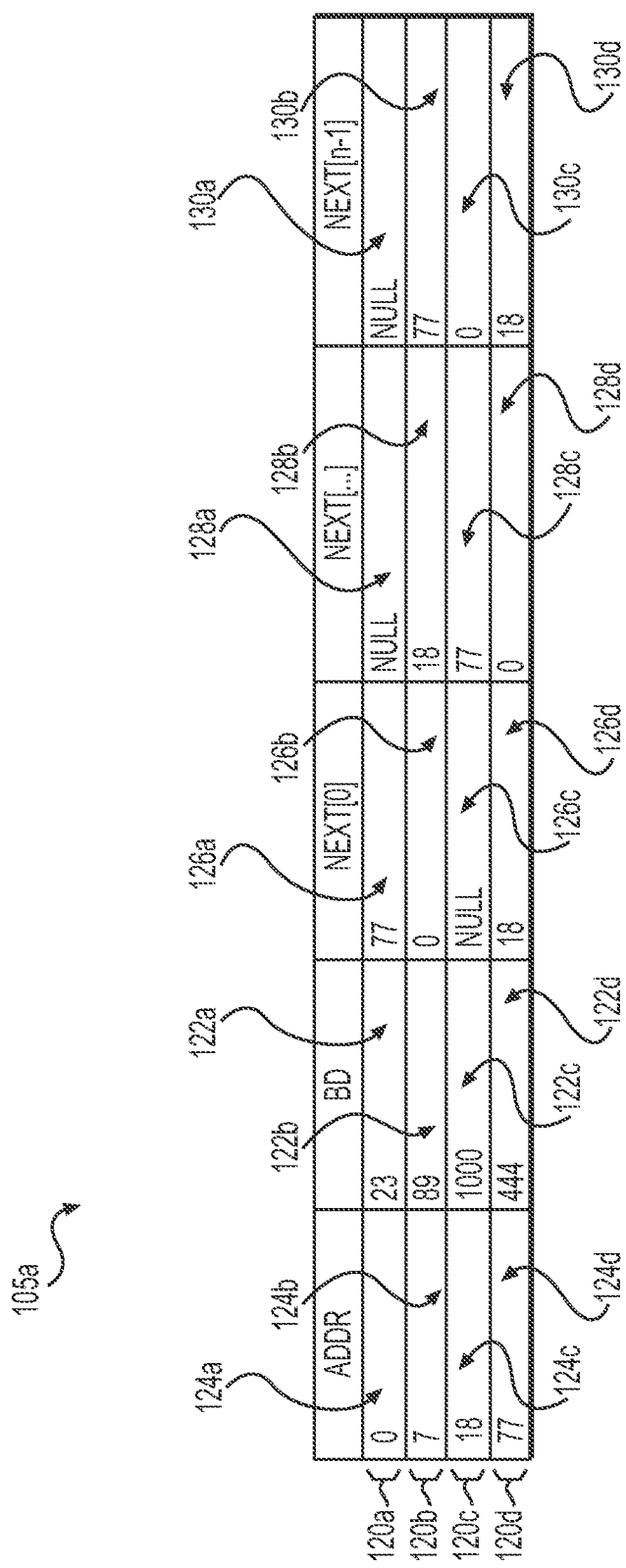
FIG. 3 is a diagram illustrating an example multi-linked Multicast Expansion Table in accordance with an illustrative embodiment.

FIG. 3 is diagram illustrating an example multi-linked Multicast Expansion Table 105 (shown as 105*a*) in accordance with an illustrative embodiment.

Multi-linked Multicast Expansion Table 105 includes a destination list having entries that enable the ASIC 112 to serially replicate each multicast traffic flow over a plurality of network ports 118 in accordance with sequential orders provided in the entries. In some embodiments the multi-linked Multicast Expansion Table 105 is implemented as a multiply-linked list that allows for latency normalization (see, e.g., FIG. 5) and/or selective prioritization across the plurality of ports 118.

As shown in FIG. 3, the multi-linked Multicast Expansion Table 105*a* includes a plurality of multi-linked references (shown as 126, 128, 130) that each denotes a next address or a next identifier of an entry of the multi-linked Multicast Expansion Table 105. As shown, the multi-linked Multicast Expansion Table 105*a* includes a first multi-linked reference 126 (shown as "NEXT[0]" 126*a*, "NEXT[0]" 126*b*, "NEXT[0]" 126*c*, and "NEXT[0]" 126*d*), a multi-linked second reference 128 (shown as "NEXT[ . . . ]" 128*a*, "NEXT[ . . . ]" 128*b*, "NEXT[ . . . ]" 128*c*, and "NEXT[ . . . ]" 128*d*), and a third multi-linked reference 130 (shown as "NEXT[n–1]" 130*a*, "NEXT[n–1]" 130*b*, "NEXT[n–1]" 130*c*, and "NEXT[n–1]" 130*d*).

Each of the multiple multi-linked references 126 provides a different sequence to traverse the entries of the multi-linked Multicast Expansion Table 105*a*. Though FIG. 3 shows only three multi-linked references (126, 128, 130), each entry 120 may include other number of multi-linked references, including 2, 3, 5, 6, 7, 8, 9, and 10. In some embodiments, each entry 120 include greater than 10 multi-linked references.

Referring still to FIG. 3, the multi-linked Multicast Expansion Table 105 (shown as 105*a*) includes a plurality of entries 120 (shown as entries 120*a*, 120*b*, 120*c*, and 120*d*) to be traversed such that the sequence of traversal through the multi-linked Multicast Expansion Table 105 corresponds to the sequence that a packet of a multicast flow or flowlet is replicated. In some embodiments, each entry is associated with a bridge domain for a given multicast packet, flow, or traffic, thus traversal of the entries per one of the multi-linked references of the multi-linked Multicast Expansion Table 105*a* may produce a different sequence of replication for the associated bridge domains. As shown in FIG. 3, the multi-linked Multicast Expansion Table 105*a* includes bridge domain "23" 122*a*, bridge domain "89" 122*b*, bridge domain "1000" 122*c*, and bridge domain "444" 122*d*.

A bridge domain, in some embodiments, is a set of logical ports that share the same flooding or broadcast characteristics-a bridge domain spans one or more physical or logical ports of a given network device 102 or of multiple network devices 102. Each bridge domain 122 can include an identifier to a corresponding network port, set of network ports, group of network ports, group of hosts, or another suitable multicasting groups.

In the context of the example embodiment shown in FIG. 3, entry 120 (shown as entries 120*a*, 120*b*, 120*c*, and 120*d*) of the multi-linked Multicast Expansion Table 105*a* includes a respective table address 124 (shown as "ADDR 0" 124*a*, "ADDR 7" 124*b*, "ADDR 18" 124*c*, and "ADDR 77" 124*d*), a respective bridge domain 122 (shown as "BD 23" 122*a*, "BD 89" 122*b*, "BD 1000" 122*c*, and "BD 444" 122*d*), and the plurality of multi-linked references, including the first multi-linked reference 126, the second multi-linked reference 128, and the third multi-linked reference 130. The table address 124 identifies a respective row of the multi-linked Multicast Expansion Table 105*a*. As stated, the multi-linked references 126, 128, 130 identifies a different "next" table address 124 of a given entry thereby generating a linked list of associated bridge domains. Each multi-linked reference (e.g., 126, 128, 130) serves as a pointer that forms a linked list that corresponds to a respective traversal sequence by indicating which respective entries 120 a given traversal sequence should proceed to until, for example, a NULL address (or equivalent thereof) is reached. The table address 124, in some embodiments, represents a memory address (e.g., of memory 116) that includes the respective bridge domain identifier 122 and/or the one or more multi-linked references (e.g., 126, 128, 130).

The example above shows the same MET destination list of the multi-linked Multicast Expansion Table 105*a* generating a different sequence of replication via selection, or use, of a different multi-linked reference (e.g., 126, 128, 130). FIG. 4, comprising FIGS. 4A, 4B, and 4C, illustrates example sequences of replication per different multi-linked references in the multi-linked Multicast Expansion Table 105, in accordance with an illustrative embodiment. As shown in FIG. 4A, the selection of multi-linked reference 126 results in serial traversal through destination list {7, 0, 77, and 18}. As shown in FIG. 4B, the selection of multi-linked reference 126 results in serial traversal through destination list {7, 18, 77, and 0} for a same starting destination list (e.g., starting destination at "7"). As shown in FIG. 4C, the selection of multi-linked reference 126 results in serial traversal through destination list {7, 77, 18, 0} for a same starting destination list (e.g., starting destination at "7").

In some embodiments, the MTS tag 108 (shown in FIG. 1) is used to select the multi-linked reference (e.g., 126, 128, 130). Thus, the same destination list can be traversed using at least n different sequences, in which n corresponds to the number of multi-linked references found in each entry 120. Thus n is three in the context of FIG. 1. The MTS tag 108, in some embodiments, is used to directly select the multi-linked reference (e.g., 126, 128, 130). That is, the parameters associated with the MTS tag 108 are transmitted from upstream network devices 102 (e.g., 102*a*) to downstream network devices 102 (e.g., 102*b*) to identify the multi-linked reference (e.g., 126, 128, 130) that is to be used to replicate packets of a given multicast flow or flowlet. In some embodiments, the MTS tag 108 is inserted in a header of a given multicast packet.

In some embodiments, the hashing module 110 is used to select the multi-linked reference (e.g., 126, 128, 130). As discussed in relation to FIG. 2, the hashing module 110, in some embodiments, includes computer executable instructions stored in memory (e.g., memory 116), which when executed, cause a processor to hashes a given multicast flow (e.g., flow n-tuples, e.g., header source and destination addresses, TCP fields, etc.) to generate the MTS tag 108. To this end, the output of a hash operator of the n-tuples (e.g., 5-tuples: a source IP address/port number, destination IP address/port number and the protocol) is used to select the multi-linked reference (e.g., 126, 128, 130).

In some embodiments, the packets of a particular flow or flowlet are each replicated by a network device 102 (e.g., switch or router) in accordance with the same replication sequence. This prevents the order of packets sent to a particular bridge domain from being corrupted when there is no guarantee that the MET-memory read-latency allows line-rate replication for any particular packet. Replications for a first packet may allow bandwidth for replications of a subsequent packet of the same flow to transmit before the first packet's replications are complete—to this end, if subsequent packet traverse the list differently, the switch may break flow order for a given BD.

In other embodiments, different flows or flowlets may be replicated using different sequences (the individual packets of each respect flow or flowlet follow the same respective replication sequence), e.g., when MET-memory read-latency is guaranteed.

The traversal sequences may be constructed in a variety of ways via selection of the multi-linked references (e.g., 126, 128, 130) and a selection of a mode, including, for example, but not limited to, random order mode, numerical order mode, reverse numerical order mode, priority by Customer Service-Level Agreement mode, or from largest delay-to-lowest mode. In some embodiments, the different MET traversal sequences is constructed to mitigate preexisting differences in reception time between equivalent receivers by providing, e.g., an average latency on sensitive flows As discussed, in some embodiments, prioritized latency may be provided. For example, if a latency-sensitive bridge domain (BD) appears at the end of a sequence, the bridge domain is programmed, in some embodiments, near the beginning of another sequence. In some embodiments, the network device 102 is configured to switch between the sequences on a per-flow- or per-flowlet-basis, e.g., such that the average replication latency experienced by a network device 102 approaches the average latency of the destination list or such that the average replication latency of prioritized bridge domains are higher than those of other bridge domains for a same multicast destination.

Figure 5:
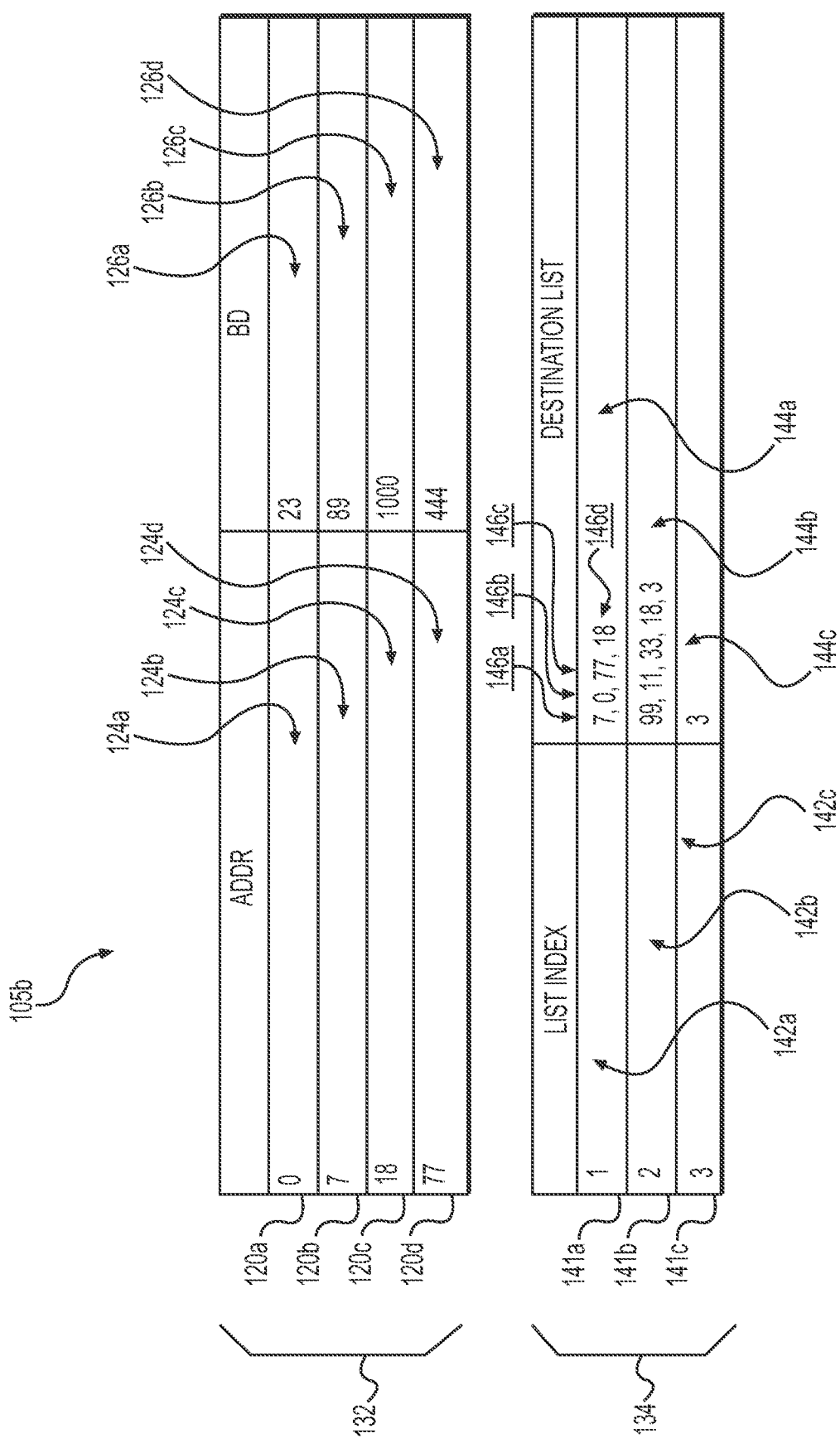
FIG. 5 is a diagram illustrating another example multi-linked Multicast Expansion Table in accordance with another embodiment of the present disclosure.

FIG. 5 is a diagram illustrating another example multi-linked Multicast Expansion Table 105 in accordance with another illustrative embodiment. The multi-linked Multicast Expansion Table 105 (shown as 105b) includes a set of two or more table portions 132, 134, that together establish a number of different traversal sequences. The first table portion 132 includes entries 120 (shown as 120a, 120b, 120c, and 120d) each comprising a table address 124 (shown in FIG. 5 as 124a, 124b, 124c, and 124d) and a corresponding bridge domain identifier 122 (shown as 122a, 122b, 122c, and 122d). A second table 134 augments the first table 132 and includes a table of entries 141 (shown as 141a, 141b, and 141c) in which each entry (e.g., 141a, 141b, 141c) defines a sequence to traverse the first table portion 132 of the multi-linked MET 105 (e.g., 105b).

As shown in FIG. 5, each entry 141 (e.g., 141a, 141b, 141c) of the second table 134 includes an index field 142 (shown as "List Index" 142a, 142b, 142c) and a corresponding list of destinations that is referenced by the table addresses 124. In some embodiments, the MTS tag 108 defines a selection of the index field 142 (e.g., 142a, 142b, 142c) of a given entry 141 (e.g., 141a, 141b, 141c).

As shown in this example, three entries are illustrated via entries 141a, 141b, and 141c. As shown, entry 141a has a list index parameter of "1" (142a) and a sequence (e.g., 144a) of table addresses {7, 0, 77, 18} which correspond to bridge domain {89, 23, 1000, 444} per table 132. Entry 141b and entry 141c further show a second sequence (e.g., 144b) of table address {99, 11, 33, 18, and 3} and a third sequence (e.g., 144c) of table address {3}, which has corresponding sequences of bridge domains provided in the first table 132 (though not shown herein).

Example MET Traversal Sequence

As discussed above, the traversal sequences may be constructed via selection of the multi-linked references (e.g., 126, 128, 130) and selection of a mode, including, for example, but not limited to, random order mode, numerical order mode, reverse numerical order mode, priority by Customer Service-Level Agreement mode, or from largest delay-to-lowest mode. Table 1 provides an example method of generating a traversal sequence via MTS tags and via modes.

TABLE 1 for (i=0; i<COUNT(List Index 1); i++) {
if mode = random; output random {7, 0, 77, 18} and remove picked
if mode = strict; output 7 and temp list {0, 77, 18}
if mode = number order; output 0 and temp list {7, 77, 18}
if mode = reverse number order; output = 77 and temp list {7, 0, 18}
}

Figure 9:
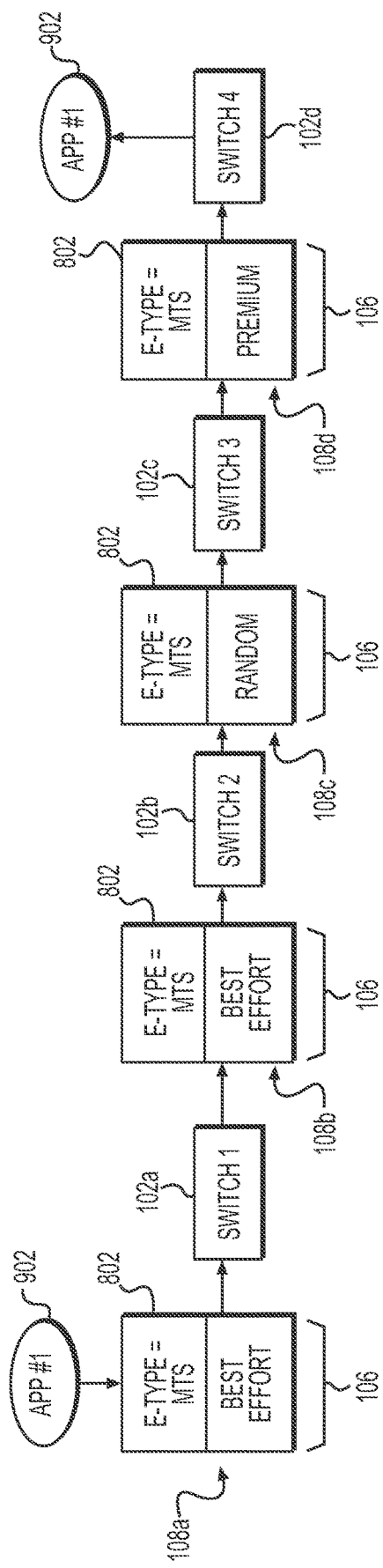
FIG. 9 is a diagram illustrating an example usage of MTS tags, in accordance with an illustrative embodiment.

In some embodiments, the mode of operation, as shown in Table 1, is designated by an MTS tag such that each MTS tag corresponds with a different mode of traversal (see FIG. 9 discussion below). In some embodiments, the mode of operation may be selected by a user or administrator of a given network. In some embodiments, the mode of operations is received in a command from a client terminal. In some embodiments, the mode of operations is received from a controller (e.g., a data center controller). FIG. 1 shows a client terminal or controller 146 that is configured to transmit a command to the network device 102 (e.g., 102b) to set the mode of generating a traversal sequence.

Random Selection Mode

Upon selection of a multi-linked reference via a MTS tag that generates a first sequence through the multi-linked MET (e.g., 105a) or selection of a first sequence via a multi-linked reference (e.g., in multi-linked MET 105b), the network device 102, when in random selection mode, may randomize the generated or selected sequence to generate a second sequence. Referring back to FIG. 3, upon selection of multi-linked reference "Next[0]" 126, a sequence of entries corresponding to table addresses "7", "0", "77", and "18" is established (corresponding to bridge domain "89", "23", "1000", and "444"). Rather than using this sequence to replicate the multicast traffic, the network device 102, in some embodiments, outputs a random selection from the established list. In some embodiments, the randomization of the established list is performed once. In other embodiments, the randomization of the established list is performed, e.g., after each list element is selected and the randomization is performed on the remaining elements in the established list. In this embodiment, the network device 102 may output a random selection of {7, 0, 77, and 18} and remove the selected entry to which the remaining elements in the established list are again randomized until the established list reaches 0 elements.

Strict Selection Mode

Upon selection of a multi-linked reference via a MTS tag that generates a first sequence through the multi-linked MET (e.g., 105a) or selection of a first sequence via a multi-linked reference (e.g., in multi-linked MET 105b), the network device 102, when in strict selection mode, may strictly use the established list of the first sequence. Referring back to FIG. 3, upon selection of multi-linked reference "Next[0]" 126, a sequence of entries corresponding to table addresses "7", "0", "77", and "18" is established (corresponding to bridge domain "89", "23", "1000", and "444"). This list is strictly used as the sequence for the multicast traffic replication.

Numerical Order Mode

Upon selection of a multi-linked reference via a MTS tag that generates a first sequence through the multi-linked MET (e.g., 105a) or selection of a first sequence via a multi-linked reference (e.g., in multi-linked MET 105b), the network device 102, when in numerical order mode, may rearrange the generated or selected first sequence in numerical order. Referring back to FIG. 3, upon selection of multi-linked reference "Next[0]" 126, a sequence of entries corresponding to table addresses "7", "0", "77", and "18" is established (corresponding to bridge domain "89", "23", "1000", and "444"). This list is reordered as entries "0", "7", "77", and "18", which corresponds to bridge domains "23", "89", "18", and "77."

Reverse-Numerical Order

Upon selection of a multi-linked reference via a MTS tag that generates a first sequence through the multi-linked MET (e.g., 105a) or selection of a first sequence via a multi-linked reference (e.g., in multi-linked MET 105b), the network device 102, when in reverse numerical order mode, may rearrange the generated or selected first sequence in reverse numerical order. Referring back to FIG. 3, upon selection of multi-linked reference "Next[0]" 126, a sequence of entries corresponding to table addresses "7", "0", "77", and "18" is established (corresponding to bridge domain "89", "23", "1000", and "444"). This list is reordered as entries "77", "18", "7", and "0", which corresponds to bridge domains "444", "1000", "89", and "23."

Example Latency Normalization Operation

Figure 6:
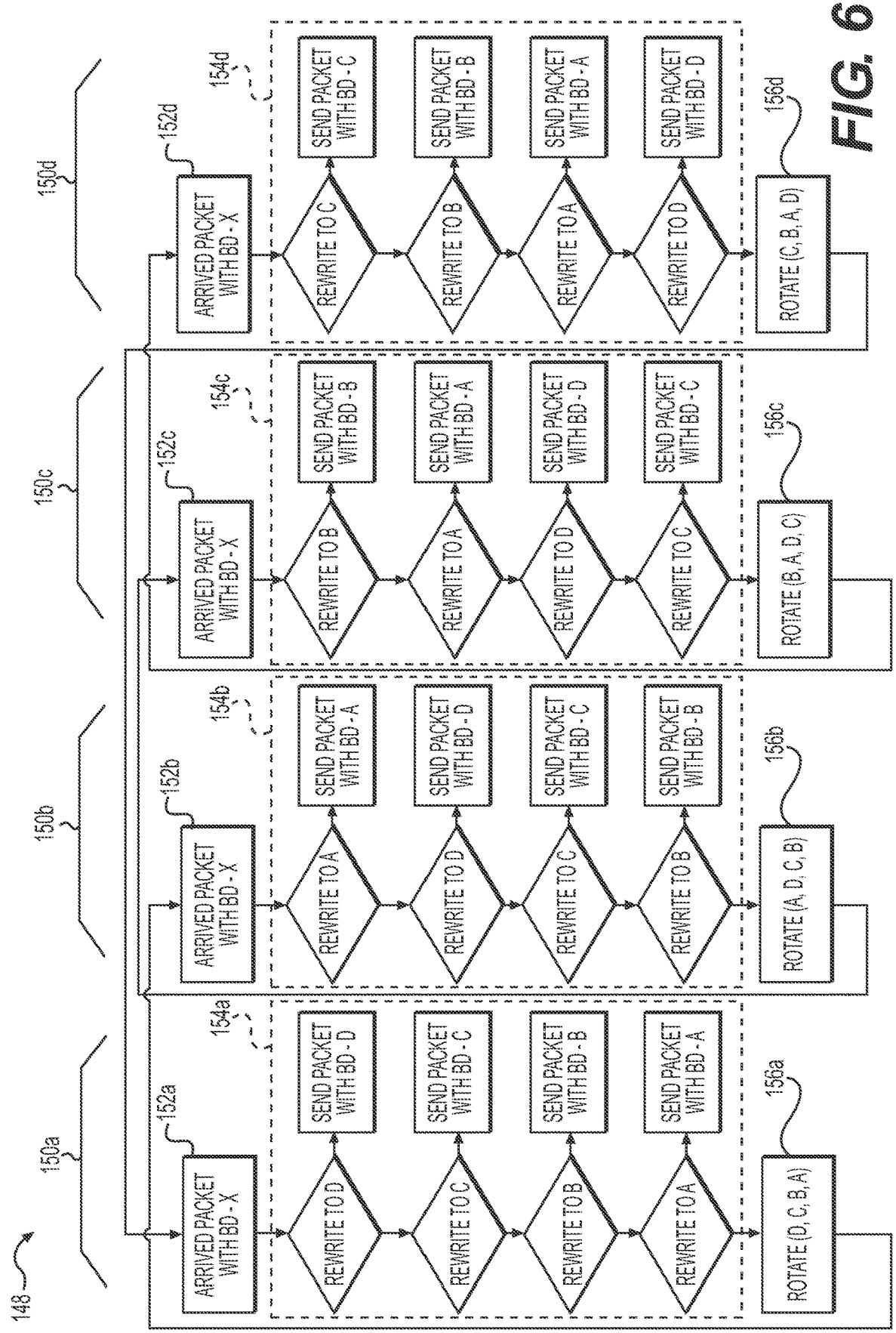
FIG. 6 is a flow diagram illustrating example operations of replicating multicast traffic in accordance with an illustrative embodiment.

FIG. 6 is a flow diagram illustrating example operations 148 for normalizing latency across a set of bridge domains (BDs) that may be performed by network devices 102 disclosed herein. As shown in FIG. 6, the operation 148 include serially replicating one or more multicast traffic flows in accordance with one or more different serial traversal sequences 150 (shown as 150a, 150b, 150c, and 150d), as discussed in relation to FIGS. 3 and 5, in which each sequence 150 is defined by the multi-linked Multicasting Expansion Table 105 (e.g., 105a or 105b).

Referring to FIG. 6, the operation 148 includes a rotation operation 156 (shown as 156a, 156b, 156c, and 156d) following the traversal of replication of a given multicast packet or flow (e.g., 104c) prior to a next replication of a next multicast packet or flow (e.g., 104d).

A rotation operation 156, as used herein, refers to an operation that varies the sequence that is generated from a multi-linked Multicast Expansion Table 105 for a given multicast packet or flow. The multicast traffic replication for the bridge domain (on a flow-to-flow basis) provides an average distribution of latency across each of the BDs that is substantially the same over time.

Figure 7:
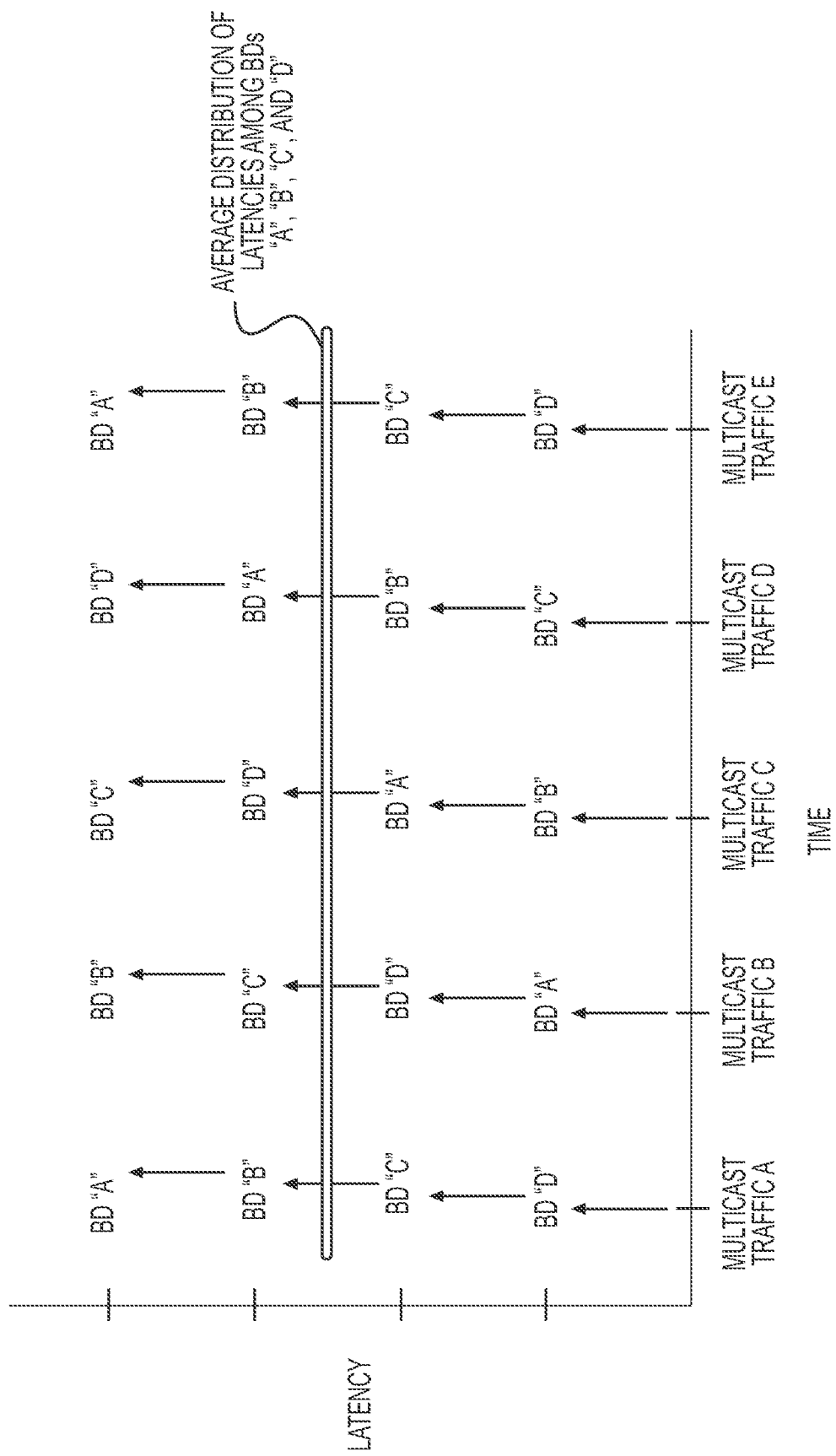
FIG. 7 is a diagram illustrating an example graph of latency as a function of time for the example operations shown in FIG. 6 in accordance with an illustrative embodiment.

FIG. 7 is a diagram illustrating an example graph of latency as a function of time for the example operations shown in FIG. 6 in accordance with an illustrative embodiment. As shown in FIG. 7, the latency among a plurality of bridge domains (e.g., "A", "B", "C", "D") is normalized by changing the order of which a given BD receives packets in subsequent flows.

As shown in FIGS. 6 and 7, in a first serial traversal sequence 150a, replication to bridge domain "D", then to bridge domain "C", then to bridge domain "B", and then to bridge domain "A" are performed (154a). Accordingly, the first serial traversal sequence 150a would result in bridge domain "A" having the highest latency among the set of A, B, C, and D whereas bridge domain "D" would have the lowest latency. After transmitting the replicated packet in accordance with a given traversal order 150a, the sequential list of bridge domains is rotated at operation 156a such that a second traversal sequence 150b is established for a subsequent multicast traffic flow. To this end, when a second multicast traffic (e.g., packet or flow) is received by the network device 102 at operation 152b, the network device 102 rewrites and transmits (154b) in accordance with the second traversal sequence (namely, "A", then "D", then "C", and then "B"). After transmitting the replicated packet in accordance with a given traversal order 150b, the sequential list of bridge domains is rotated at operation 156b such that a third traversal sequence 150c is established for a subsequent multicast traffic flow. To this end, when a third multicast traffic (e.g., packet or flow) is received by the network device 102 at operation 152c, the network device 102 rewrites and transmits (154c) in accordance with the second traversal sequence (namely, "B", then "A", then "D", and then "C"). After transmitting the replicated packet in accordance with a given traversal order 150c, the sequential list of bridge domains is rotated at operation 156c such that a fourth traversal sequence 150d is established for a subsequent multicast traffic flow. To this end, when a fourth multicast traffic (e.g., packet or flow) is received by the network device 102 at operation 152d, the network device 102 rewrites and transmits (154d) in accordance with the second traversal sequence (namely, "C", then "B", then "A", and then "D"). After transmitting the replicated packet in accordance with a given traversal order 150d, the sequential list of bridge domains is rotated at operation 156d such that a fifth traversal sequence that is the same as the first traversal sequence 150a is established for a subsequent multicast traffic flow.

As shown in FIG. 7, the bridge-domain-to-bridge-domain replication latency between each replication is shown to be a constant value (that is, the spacing between each bridge domain replication in the y-axis over time (shown in the x-axis)). The varying of the replication sequences across multiple sequences facilitates the control distribution of the average distribution of latencies across all of the bride domain replications for multicast traffic.

Latency can be measured by (IEEE 1588) Precision Time Protocol, which provides timestamp-based latency measurements. In some embodiments, latency measurements are used, e.g., in a feedback loop, to update or reconstruct the traversal sequences, e.g., of the MET 105. The feedback loop may run for set of a multicast traffic or based on a time parameter. The latency measurements may be used to further refine the control of latency distributions among bridge domain replications for multicast traffic for a given network device 102.

Dynamically Updatable Multi-linked Multicast Expansion Table

In some embodiments, the network device 102 is configured to periodically update one or more sequences of the Multicast Explanation Table 105. In some embodiments, the updating is performed without stopping or halting replication operations (particularly of multicast replication operation).

To this end, the exemplified systems and methods may be used to reorder an MET sequence by providing redundant MET sequences, where all of a flow's packets carry the MTS of an active MET sequence, while inactive sequences can be dynamically reprogrammed. Traffic can thus flow during this reprogramming without interruption. Suboptimal latency distributions may occur in the interim. The network may resume using all available MET sequences after reprogramming finishes.

Messaging Protocol

A messaging protocol may be used to enables a controller-driven or distribution system to support multiple Multicast Expansion Table traversal sequences throughout a network. In some embodiments, the messaging protocol facilitates communication, e.g., from a controller, of the number of sequences available per switch for each Multicast Expansion Table destination list, and coordinates changes in Multicast Expansion Table sequences (e.g., via MTS tags 108). The messaging protocol may be used to optimize end-to-end L3 latency distribution or to account for changes in network performance or member lists.

MTS-Based EtherTypes

As discussed above in reference to FIG. 1, in some embodiments, the network devices 102 utilize a MTS (Multicast Expansion Table Traversal Sequence) tag 108 to ascertain which traversal sequence of the Multicast Expansion Table 105 is to be used when serially replicating a given multicast traffic flow.

Figure 8:
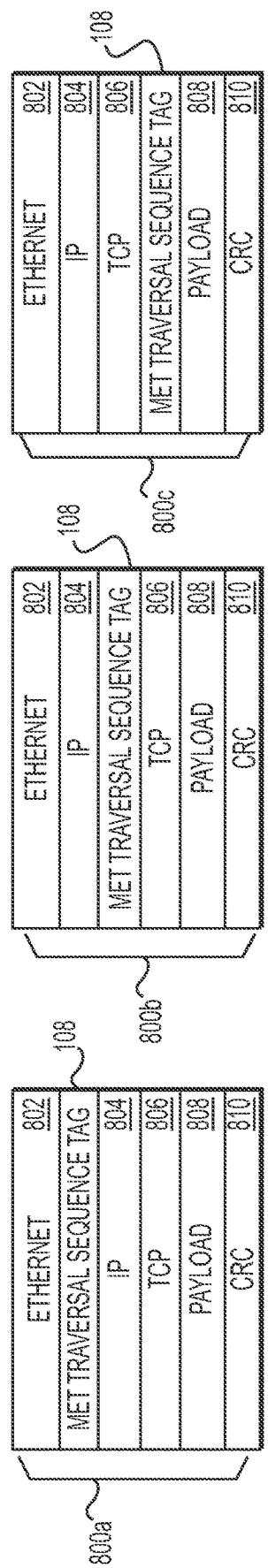
FIG. 8, comprising

In some embodiments, the MTS tag 108 is placed in fields of a packet 106 that are defined by a MTS-based EtherTypes (e.g., a reserved EtherType), which are for transmitting MTS tags 108 and related MTS tag control information. FIG. 8, comprising FIGS. 8A, 8B, and 8C, illustrates example packet structures 800 (shown respectively as 800A, 800B, 800C) that each has an MTS tag 108 located in a MTS-based EtherType (e.g., as shown in packet 106). The MTS tag 108 can be used, e.g., for service level agreement (SLA), at per-switch level to achieve latency fairness or deterministic latency for a given switch or group of switches. The MTS tag 108 can also be used, e.g., for service level agreement (SLA), at network-wide level to achieve latency fairness or deterministic latency, e.g., for a given multicast group.

As shown in FIGS. 8A-8C, in some embodiments, the structure of a packet 106 can include a header portion (e.g., Ethernet header 802, an MET traversal sequence (MTS) tag 108, an IP header 804, a TCP header 806), a packet payload 808, and a cyclic redundancy check (CRC) 810. The MTS tag 108 can be inserted at various locations within packet structure of the packets 106. For example, as shown in FIG. 8A, the MTS tag 108 is inserted after the Ethernet header 802 and before IP header 804. As shown in FIG. 8B, the MTS tag 108 is inserted after the IP header 804 and before TCP header 806. As shown in FIG. 8C, the MTS tag 108 is inserted after the TCP header 806 and before the packet payload 808. As used here, "before" and "after" refers to a special relationship with respect to a distinct reference location in a given packet. In some embodiments, during the insertion of the MTS tag 108, the EtherType field of the Ethernet header 802 is rewritten to indicate that the packet is carrying an MTS tag 108. As stated above, the MTS tag 108 can be used, e.g., for service level agreement (SLA) at network-wide level to achieve latency fairness or deterministic latency. In some embodiments, a single MTS tag is used in the packet that can be recognized by all supporting device for a designated service level agreement (e.g., fair or premium latency). In other embodiments, MTS tag may be specified per member device for a given multicast group.

As stated above, the MTS tag 108 can be used, e.g., for service level agreement (SLA), to manage network devices 102 at per-switch level in which the MTS tag is specified per member device for a given multicast group. For example, as shown in FIG. 9, an application 902 transmits a packet 106 with a MTS tag 108, comprising per member designation, through a plurality of network device 102 (shown as "SWITCH 1" 102A, "SWITCH 2" 102B, "SWITCH 3" 102C, and "SWITCH 4" 102D). At each supported network devices 102, upon reading the EtherType field of the Ethernet header 802 to be a MTS tag Ethertype, the respective network device 102 read fields of the MTS tag 108 to establish a mode of traversal is to be performed thereat. For example, in the context of FIG. 9, network device 102A performs a best effort traversal based on the network device 102A reading one or more fields of the MTS tag 108A which instructs the network device 102A to perform the best effort traversal. A best effort traversal can include, for example, performing a one-to-one replication (e.g., non-multi-destination replication). Similarly, network device 102B performs a best effort traversal as defined by one or more fields of the MTS tag 108B. At network device 102C, the network device 102C serially replicates packet 106 to a plurality of destinations in a random order as defined by one or more fields of the MTS tag 108C (e.g., Random Selection Mode of MET 105B). This mode can be used to minimize the average latency among the plurality of destinations. At network device 102D, the network device 102D serially replicates packet 106 to a plurality of destinations in accordance with a premium mode as defined by one or more fields of the MTS tag 108D (e.g., Strict Selection Mode of MET 105B). The premium mode can be used to prioritize the delivery of replicate packets to a certain destination such that the latency of the destination is prioritized over other destinations. The premium mode may be set based on a customer Service-Level Agreement, for example.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, network device 102 may be applicable in other exchanges or routing protocols. Moreover, although network device 102 has been illustrated with reference to particular elements and operations that facilitate the communication process, these elements, and operations may be replaced by any suitable architecture or process that achieves the intended functionality of network device 102.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of an executable file comprising instructions that can be understood and processed on a computer, and may further include library modules loaded during execution, object files, system files, hardware logic, software logic, or any other executable modules.

In example implementations, at least some portions of the activities may be implemented in software provisioned on networking device 102. In some embodiments, one or more of these features may be implemented in hardware, provided external to these elements, or consolidated in any appropriate manner to achieve the intended functionality. The various network elements may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, the network elements of FIG. 1 (e.g., network devices 102) described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that single processor and a single memory element are responsible for certain activities. In a general sense, the arrangements depicted in the Figures may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory 116) can store data used for the operations described herein. This includes the memory being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processor 114) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.'

The list of network destinations can be mapped to physical network ports, virtual ports, or logical ports of the router, switches, or other network devices and, thus, the different sequences can be traversed from these physical network ports, virtual ports, or logical ports.

What is claimed is:

1. An apparatus comprising:
a plurality of network ports configured to serially replicate multicast traffic, the multicast traffic including a first multicast traffic and a second multicast traffic so as to forward, via a network, replicated multicast traffic to a plurality of computing devices, wherein each multicast traffic comprises one or more packets to be directed to multiple destination flows;
a Multicast Expansion Table (MET), implemented in memory of the apparatus, comprising a plurality of entries, wherein the plurality of entries are each assignable a network port of the plurality of network ports, wherein traversal of an entry with an assigned network port define a serial replication of a multicast traffic for the network port, wherein at least two entries of the plurality of entries comprise two or more pointers that form groups of pointers, including a first group and a second group, wherein each group of the first group and second group includes a set of pointers that form a multi-linked list associated with traversal of the plurality of entries, wherein each of the at least two entries is assignable at least one network port of the plurality of network ports, wherein traversal of a group of pointers associated with the plurality of entries, or a portion thereof, for a given multicast traffic, defines a sequence of the serial replication of the given multicast traffic over one or more sets of network ports, wherein the Multicast Expansion Table is dynamically updatable during runtime that defines the sequence of the serial replication, wherein the Multicast Expansion Table is dynamically updatable via a packet received during runtime and updated without stopping or halting replication operations, and wherein the sequence of the serial replication is reordered when the Multicast Expansion Table is dynamically updated; and
a network interface, wherein the network interface is configured to i) serially replicate packets associated with the first multicast traffic over a first set of network ports in accordance with (i) a first sequence corresponding to a first traversal of the entries in the Multicast Expansion Table when the first group is selected and (ii) a second sequence corresponding to a second traversal of the entries in the Multicast Expansion Table when the second group is selected.

2. The apparatus of claim 1, wherein each of the at least two entries is associated with one or more network ports of the plurality of network ports.

3. The apparatus of claim 1, wherein the sequence of the serial replication is reordered in response to receipt of a packet of a multicast flow that comprises a tag specifying a traversal sequence of a Multicast Expansion Table (MET).

4. The apparatus of claim 3, wherein the tag is configured as a Multicast Expansion Table traversal sequence (MTS) tag.

5. The apparatus of claim 4, wherein all of a flow's packets carry the Multicast Expansion Table traversal sequence (MTS) tag of an active MET sequence.

6. The apparatus of claim 3, wherein the tag specifies at least one of a random traversal sequence, a reverse traversal sequence, a numerically-defined traverse sequence, and a strictly-defined traverse sequence.

7. The apparatus of claim 3, wherein the tag specifies a service level agreement (SLA) at a per-switch level.

8. The apparatus of claim 7, wherein the tag specifies a latency fairness for a group of switches.

9. The apparatus of claim 7, wherein the tag specifies a deterministic latency for a group of switches.

10. The apparatus of claim 3, wherein the tag specifies a service level agreement (SLA) at a network-wide level.

11. A method comprising:
receiving, at a network port of a network device, a first packet associated with a first multicast traffic;
in response to receipt of the first packet, i) serially replicating, across a first set of network ports of a plurality of network ports associated with the network device, according to a first sequence of the first set of network ports, the first multicast traffic and ii) forwarding, via a network, the replicated first multicast traffic to a plurality of computing devices associated with the first multicast traffic;
receiving, at the network device, a second packet associated with a second multicast traffic; and
in response to receipt of the second packet, i) serially replicating, across a second set of network ports of a plurality of network ports associated with the network device, according to a second sequence of the second set of network ports, the second multicast traffic and ii) forwarding, via the network, the replicated second multicast traffic to a plurality of computing devices associated with the second multicast traffic,
wherein the serial replication of the first multicast traffic and the second multicast traffic is i) based on traversal of a plurality of entries in a Multicast Expansion Table (MET) associated with the network device and ii) based on a sequence list associated therewith, wherein the Multicast Expansion Table is dynamically updatable during runtime, wherein the Multicast Expansion Table is dynamically updatable via a packet received during runtime and updated without stopping or halting replication operations,
wherein the Multicast Expansion Table (MET), implemented in memory of the network device, comprises the plurality of entries, wherein the plurality of entries are each assignable a network port of the plurality of network ports, wherein traversal of an entry with an assigned network port define a serial replication of a multicast traffic for the network port, wherein at least two entries of the plurality of entries comprise two or more pointers that form groups of pointers, including a first group and a second group, wherein each group of the first group and second group includes a set of pointers that form a multi-linked list associated with traversal of the plurality of entries, wherein each of the at least two entries is assignable at least one network port of the plurality of network ports, and wherein traversal of a group of pointers associated with the plurality of entries, or a portion thereof, for a given multicast traffic, defines a sequence of the serial replication of the given multicast traffic over one or more sets of network ports.

12. The method of claim 11, wherein each of the at least two entries is associated with one or more network ports of the plurality of network ports.

13. The method of claim 11, wherein the sequence of the serial replication is reordered in response to receipt of a packet of a multicast flow that comprises a tag specifying a traversal sequence of a Multicast Expansion Table (MET).

14. The method of claim 13, wherein the tag is configured as a Multicast Expansion Table traversal sequence (MTS) tag.

15. The method of claim 14, wherein all of a flow's packets carry the Multicast Expansion Table traversal sequence (MTS) tag of an active MET sequence.

16. A non-transitory computer readable medium comprising instructions stored thereon, wherein execution of the instructions, causes a processor of a network device to configure the network device to:
receive, at a network port of the network device, a first packet associated with a first multicast traffic;
in response to receipt of the first packet, i) serially replicate, across a first set of network ports of a plurality of network ports associated with the network device, according to a first sequence of the first set of network ports, the first multicast traffic and ii) forward, via a network, the replicated first multicast traffic to a plurality of computing devices associated with the first multicast traffic;
receive, at the network device, a second packet associated with a second multicast traffic; and
in response to receipt of the second packet, i) serially replicate, across a second set of network ports of a plurality of network ports associated with the network device, according to a second sequence of the second set of network ports, the second multicast traffic and ii) forward, via the network, the replicated second multicast traffic to a plurality of computing devices associated with the second multicast traffic,
wherein the serial replication of the first multicast traffic and the second multicast traffic is i) based on traversal of a plurality of entries in a Multicast Expansion Table (MET) associated with the network device and ii) based on a sequence list associated therewith, and wherein the Multicast Expansion Table is dynamically updatable during runtime, wherein the Multicast Expansion Table is dynamically updatable via a packet received during runtime and updated without stopping or halting replication operations,
wherein the Multicast Expansion Table (MET), implemented in memory of the network device, comprises the plurality of entries, wherein the plurality of entries are each assignable a network port of the plurality of network ports, wherein traversal of an entry with an assigned network port define a serial replication of a multicast traffic for the network port, wherein at least two entries of the plurality of entries comprise two or more pointers that form groups of pointers, including a first group and a second group, wherein each group of the first group and second group includes a set of pointers that form a multi-linked list associated with traversal of the plurality of entries, wherein each of the at least two entries is assignable at least one network port of the plurality of network ports, and wherein traversal of a group of pointers associated with the plurality of entries, or a portion thereof, for a given multicast traffic, defines a sequence of the serial replication of the given multicast traffic over one or more sets of network ports.

17. The non-transitory computer readable medium of claim 16, wherein each of the at least two entries is associated with one or more network ports of the plurality of network ports.

18. The non-transitory computer readable medium of claim 16, wherein the sequence of the serial replication is reordered in response to receipt of a packet of a multicast flow that comprises a tag specifying a traversal sequence of a Multicast Expansion Table (MET).

19. The non-transitory computer readable medium of claim 18, wherein the tag is configured as a Multicast Expansion Table traversal sequence (MTS) tag.

20. The non-transitory computer readable medium of claim 19, wherein all of a flow's packets carry the Multicast Expansion Table traversal sequence (MTS) tag of an active MET sequence.

* * * * *